United States Patent
Hsieh et al.

(10) Patent No.: US 8,952,934 B2
(45) Date of Patent: Feb. 10, 2015

(54) OPTICAL TOUCH SYSTEMS AND METHODS FOR DETERMINING POSITIONS OF OBJECTS USING THE SAME

(71) Applicant: Wistron Corp., New Taipei (TW)

(72) Inventors: Sheng-Hsien Hsieh, New Taipei (TW); Po-Liang Huang, New Taipei (TW); Shou-Te Wei, New Taipei (TW); Ruey-Jiann Lin, New Taipei (TW)

(73) Assignee: Wistron Corp., New Taipei (TW)

(*) Notice: Subject to any disclaimer, the term of this patent is extended or adjusted under 35 U.S.C. 154(b) by 53 days.

(21) Appl. No.: 13/953,362

(22) Filed: Jul. 29, 2013

(65) Prior Publication Data
US 2014/0132566 A1 May 15, 2014

(30) Foreign Application Priority Data
Nov. 13, 2012 (TW) .............................. 101142150 A (51) Int. Cl.
*G06F 3/045* (2006.01)
*G06F 3/042* (2006.01)

(52) U.S. Cl.
CPC .................................. *G06F 3/0425* (2013.01)
USPC ............................. 345/175; 345/173; 345/156

(58) Field of Classification Search
None
See application file for complete search history.

(56) References Cited

U.S. PATENT DOCUMENTS

| 8,723,789 B1 * | 5/2014 | Rafii .............................. 345/158 |
| 8,872,955 B2 * | 10/2014 | Takahashi ................ 348/333.02 |
| 2011/0291991 A1 | 12/2011 | Lin |
| 2012/0225719 A1 | 9/2012 | Nowozin et al. |
| 2012/0268372 A1 * | 10/2012 | Park et al. ...................... 345/158 |

FOREIGN PATENT DOCUMENTS

TW 2011/37708 A1 11/2011

OTHER PUBLICATIONS

Taiwan Patent Office, Office Action, Patent Application Serial No. 101142150, Oct. 7, 2014, Taiwan.

* cited by examiner

*Primary Examiner* — Muhammad N Edun (57) ABSTRACT

Methods for determining positions of objects for use in an optical touch system are provided. The optical touch system at least includes a depth image sensor and a touch plane, the depth image sensor having a sensing area covering the touch plane. First, when an object is detected by the depth image sensor, image information is obtained by using the depth image sensor, wherein the image information includes angle information and depth information related to the depth image sensor for the object. Thereafter, it is determined whether a position of the object is located at the inside or the outside of the touch plane according to the angle information and the depth information.

13 Claims, 7 Drawing Sheets

OPTICAL TOUCH SYSTEMS AND METHODS FOR DETERMINING POSITIONS OF OBJECTS USING THE SAME

CROSS REFERENCE TO RELATED APPLICATIONS

This Application claims priority of Taiwan Application No. 101142150, filed on Nov. 13, 2012, and the entirety of which is incorporated by reference herein.

BACKGROUND OF THE INVENTION

1. Field of the Invention

The disclosure relates generally to optical touch systems and methods for determining positions of objects using the same, and, more particularly to optical touch systems and related methods for determining positions of objects on a touch plane without any side bars installed thereon.

2. Description of the Related Art

Recently, as more and more equipments capable of using touch input operation commands for inputting, in some electronic devices such as smart phones, PDAs, tablet PCs, Ultra Mobile PCs (UMPCs) and so on, a touch screen which is directly touchable may be provided as a main input device for users to control functions thereof. The touch screen is a screen integrated with an optical touch system, which has a touch-sensitive surface comprising sensors in at least one dimension to detect contact and movement of an object (input tool), such as a pen/stylus or finger near or on the touch-sensitive surface. Currently, optical touch system most commonly includes two kinds of shattered glass and reflective display. The shattered glass optical touch system is equipped with reflective edge bars on sides of touch screen, so that when light emitted, reflections from side bars can be used to distribute light on entire touch screen, so in view of its lens, entire touch screen is illuminated. For the shattered glass optical touch system, when an object such as a finger placed on a location of the touch screen, light of the location will be shattered by the finger, hence, in view of its lens, finger position will become a lower laminated area, so from the lower illuminated area, finger position can be found. With reflective display optical touch system, light absorption or light diffusion side bars will be equipped at sides of the touch screen, so that when light emitted, light touches side bars will be absorbed or diffused, so in view of its lens, entire touch screen is dark. For the reflective display type optical touch system, when a finger is placed on the touch screen, light will be reflected from the finger, and the reflected light will be received by lens, hence, in view of its lens, the finger will become a light enhanced area, so from the light enhanced area, the finger position can be found.

For both above-mentioned optical touch systems, however, side bars must be used, in addition to cost increased, complexity in assembling also increased. Further, currently the touch plane agglutination is adopted for most side bar fastening techniques, consequently, shed or distorted side bars problems prone to occur, thereby affecting determination of the object position.

BRIEF SUMMARY OF THE INVENTION

Optical touch systems and methods for determining positions of objects thereof are provided.

In an embodiment of a method for determining positions of objects for use in an optical touch system, wherein the optical touch system comprises at least a depth image sensor and a touch plane, the depth image sensor having a sensing area covering the touch plane, in response to detecting an object by the depth image sensor, the depth image sensor is utilized to obtain image information of the object, wherein the image information comprise angle information and depth information of the object relative to the depth image sensor. It is then determined whether a position of the object is located at the inside or the outside of the touch plane according to the angle information and the depth information.

An embodiment of an optical touch system includes a depth image sensor, a touch plane and a processing circuit. The depth image sensor provides image information corresponding to the object, wherein the image information comprise angle information and depth information of the object relative to the depth image sensor. The depth image sensor has a sensing area covering the touch plane. The processing circuit, in response to detecting an object by the depth image sensor, uses the depth image sensor to obtain the image information of the object and determines whether a position of the object is located at the inside or the outside of the touch plane according to the angle information and the depth information within the image information.

Methods for determining positions of objects may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
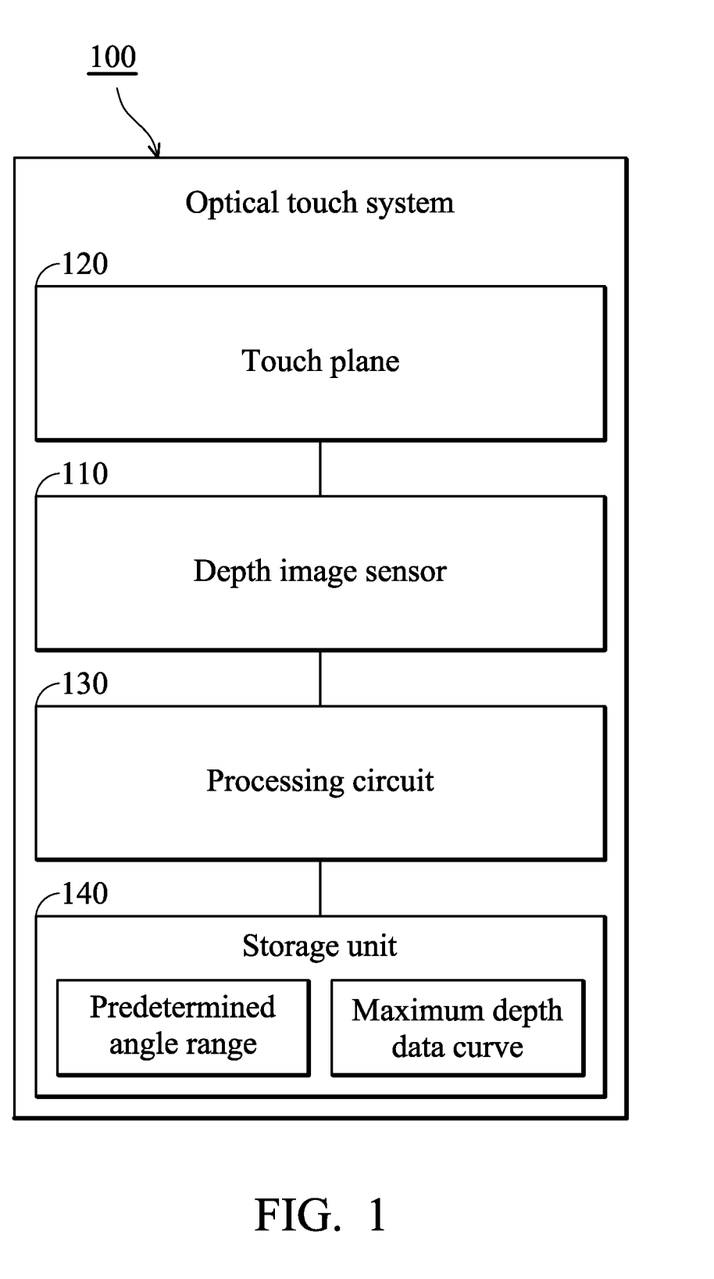
FIG. 1 is a schematic diagram illustrating an embodiment of an optical touch system of the invention.

FIG. 1 is a schematic diagram illustrating an embodiment of an optical touch system 100 of the invention. The optical touch system 100 can be used in an electronic device, such as a PDA (Personal Digital Assistant), a smart phone, a mobile phone, an MID (Mobile Internet Device, MID), a laptop computer, a car computer, a digital camera, a multi-media player, a game device, or any other type of mobile computational device, however, it is to be understood that the invention is not limited thereto. For example, in one embodiment, the optical touch system 100 can be served as a touch-input device of a tablet computer for performing various touch inputting and operations, but it is not limited thereto. The optical touch system 100 at least comprises a depth image sensor 110, a touch plane 120, a processing circuit 130, and a storage unit 140. The depth image sensor 110 (e.g. a Depth Camera) can generate image information corresponding to an object, such as a pen/stylus or finger, when such object is detected, wherein the image information may include angle information of the touch point of the object position relative to the depth image sensor 110, and depth information of the touch point of the object position relative to the depth image sensor 110. Through the depth information, a distance between the position of the object and the depth image sensor 110 can be obtained. The touch plane 120 is a screen integrated with a touch-sensitive device (not shown). The touch-sensitive device has a touch-sensitive surface comprising sensors in at least one dimension to detect contact and movement of the object (input tool), such as a pen/stylus or finger near or on the touch-sensitive surface. For example, the touch plane 120 may be a sensing coverage formed by the upper surface of a touch panel without side bars. The touch plane 120 can also display related data, images, icons, and/or interfaces.

Figure 2:
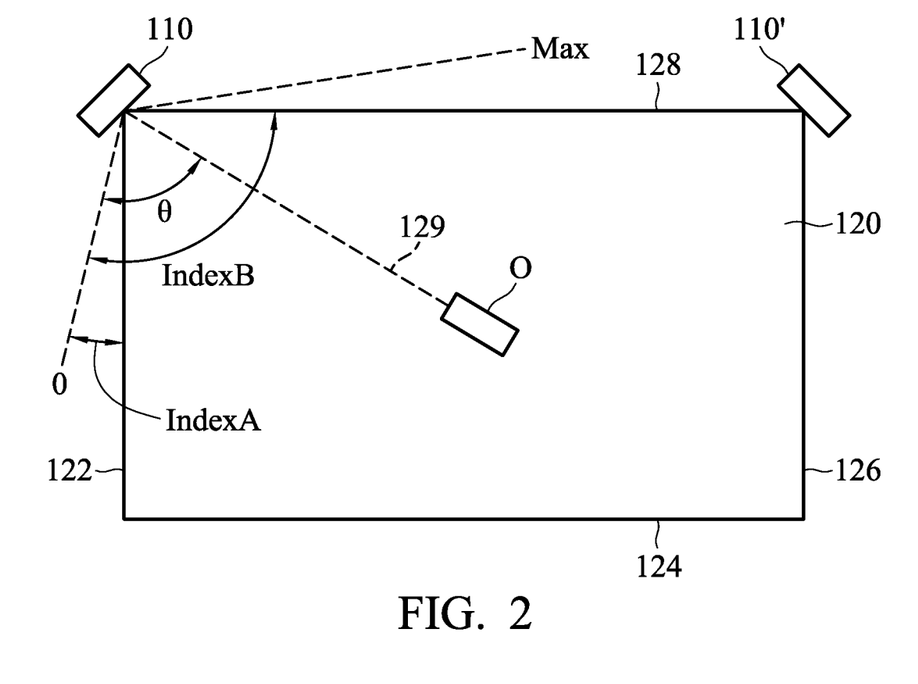
FIG. 2 is a schematic diagram illustrating an embodiment of a configuration of the optical touch system of the invention.
Figure 3:
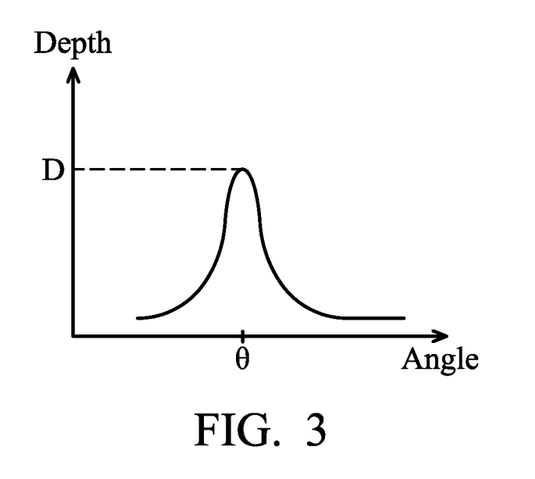
FIG. 3 is a schematic diagram illustrating an embodiment of image information of the object captured by the depth image sensor of the invention.

Referring to FIG. 2, FIG. 2 is a schematic diagram illustrating an embodiment of a configuration of the optical touch system 100 of the invention. As shown in FIG. 2, the touch plane 120 is a rectangular area enclosed by four sides 122-128, and the depth image sensor 110 is located at a corner formed by two adjacent sides of 122 and 128, wherein the depth image sensor 110 is equipped with a viewing angle ranged from 0 degree to a maximum value Max degree (such as: 110 degree) so that any object presented in the range of viewing angle of the depth image sensor 110 can all be detected by the depth image sensor 110 and related image information can be captured. The image information may include angle information of the touch point of the object position relative to the depth image sensor 110 and depth information of the touch point of the object position relative to the depth image sensor 110 in which the angle information is provided with an angle value, which represents angle of the touch point of the object position relative to the depth image sensor 110, i.e. the angle counted starting from 0 degree of the depth image sensor 110. As shown in FIG. 2, for the object O, its angle value of the touch position relative to the depth image sensor 110 is the included angle Θ of line segment 129 and 0 degree. For example, assume that the included angle Θ is defined as 50 degree, then the angle value of the position of the object O relative to the depth image sensor 110 is set to be 50 degree. Similarly, depth information is provided with a depth value and a distance between the object touch position and the depth image sensor 110 can be estimated by using the depth value. In some embodiments, the depth value is represented by peak light strength within the object's image information captured by the depth image sensor 110, wherein the higher the strength the smaller the depth, hence the closer the distance between the object and the depth image sensor 110. Contrarily, the lower the strength the greater the depth value, hence the farer the distance between the object and the depth image sensor 110. Referring to FIG. 3, which is a schematic diagram illustrating an embodiment of image information of the object O captured by the depth image sensor 110 of the invention, where horizontal axis "Angle" represents the angle value of the object O relative to the depth image sensor 110, while horizontal axis "Depth" represents the depth value of the object O relative to the depth image sensor 110. It is observed from FIG. 3 that the angle value of the object O is Θ, the depth value of which is D, wherein both values can be applied to subsequent position determinations. In addition, as shown in FIG. 2, in one embodiment, another depth image sensor 110' can also be configured on a corner formed by two adjacent sides 126 and 128, i.e., a corner adjacent to the corner that the depth image sensor 110 is configured thereon to perform detection of the object O simultaneously, so that the processing circuit 130 can use image information captured by both the depth image sensor 110 and the depth image sensor 110' to obtain coordinates of the object position. Methods for determining positions of objects will be discussed further in the following paragraphs. The storage unit 140 (e.g. a memory) can be used to store related data, such as predetermined angle range data, a maximum depth data curve and so on, but the invention is not limited thereto. The predetermined angle range data is visual angle/viewing angle smaller than the depth image sensor 110 while the maximum depth data curve represents the maximum depth values relative to every angles in the predetermined angle range, i.e. the farthest distance of each angle of the object O and the depth image sensor 110. Note that the predetermined angle range can be obtained by putting the object O at different sides of the touch plane 120, and recording/storing the angle range to the storage unit 140 when the depth image sensor 110 is at sides. Because possible angles of captured image range of the depth image sensor 110 exceed the touch plane 120, it can be confined that the angle of the touch point not within the predetermined angle range is outside of the touch plane. For example, as shown in FIG. 2, the object O can be put at sides 122 and 128 of the touch plane 120, and a lower limit value IndexA and an upper limit value IndexB can be obtained respectively, thus the predetermined angle range is namely angles included between the lower limit value IndexA and the upper limit value IndexB. It is assumed that if the angle of the touch point of the object position is not within the predetermined angle range, then its position can be determined as located at the outside of the touch plane, while if the angle of the touch point of the object position is within the predetermined angle range, then its position can be determined as located at the inside of the touch plane.

Figure 4:
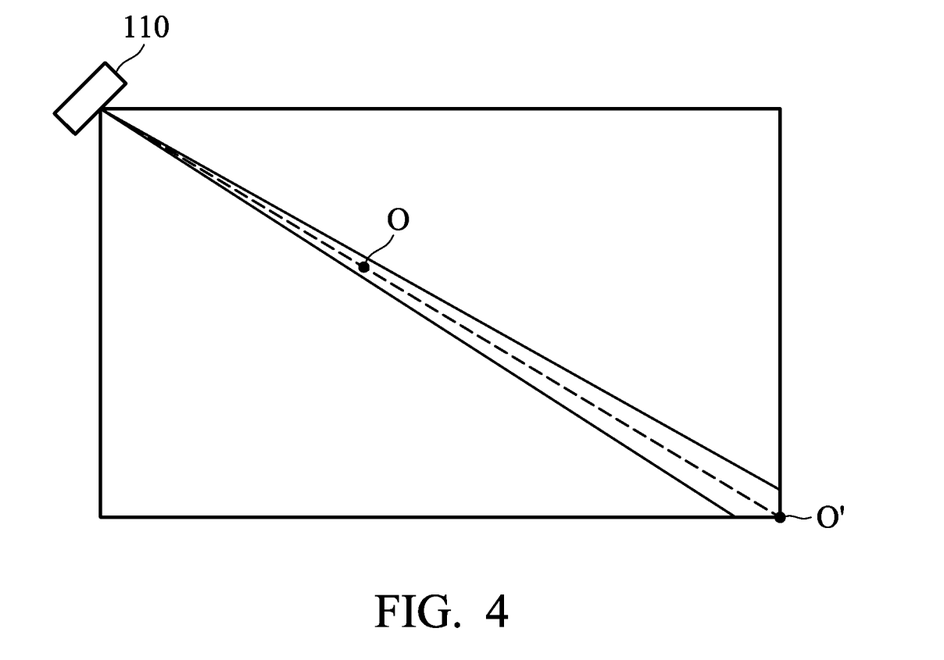
FIG. 4 is a schematic diagram illustrating an embodiment of a obtaining method for obtaining the maximum depth information of the invention.

Similarly, the maximum depth information can be obtained by inputting touch points at each side of the touch plane 120 in advance, and recording depth values of farthest distances of captured angles of the depth image sensor 110 on the touch plane 120, and storing the depth values to the storage unit 140. Because in the image of the depth image sensor 110, there are many touch points in an angle with different distances, therefore, only recording farthest distance of touch points on sides, it can be found that the touch point with closer distance on the same angle is located at the inside of the touch plane, as shown in FIG. 4. Referring to FIG. 4, the touch point O at the middle and the touch point O' at the lower right corner are located at the same angle, but the touch point O' at lower right corner is farther to the depth image sensor 110 than the touch point O. Therefore, it can be determined that the position of the object is located at the inside of the touch plane 120 if the distance of relative touch point of the object position on the angle is less than the distance of the touch point O' at lower right corner.

Figure 5:
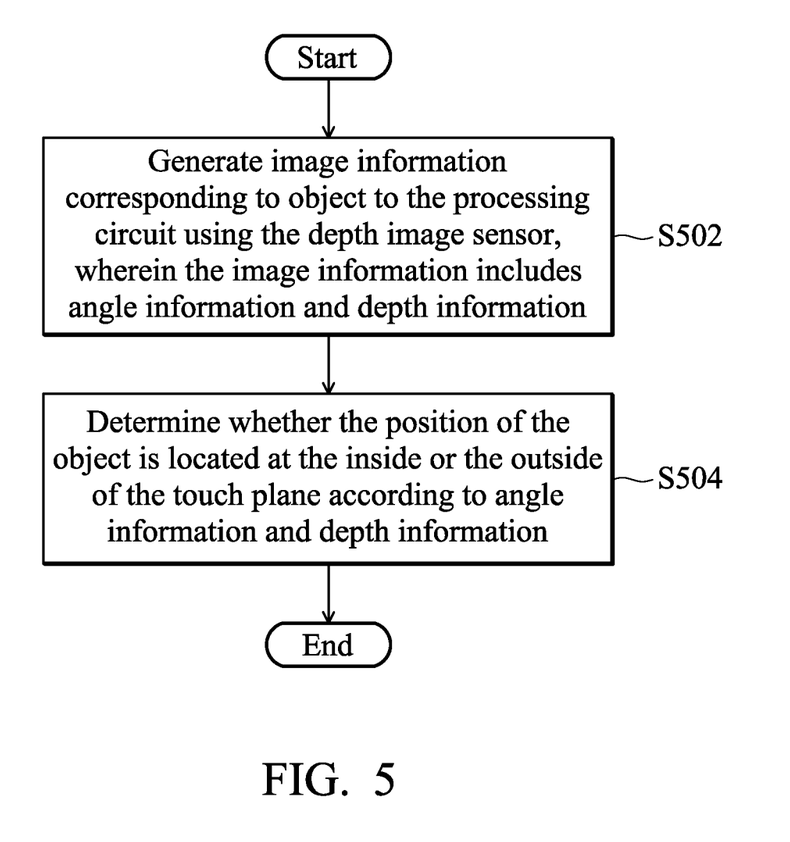
FIG. 5 is a flowchart of an embodiment of a method for determining positions of objects of the invention.

FIG. 5 is a flowchart of an embodiment of a method for determining positions of objects of the invention for determining whether the position of an object is located at the inside of the touch plane. The method for determining positions of objects can be applied to an optical touch system (e.g.

the optical touch system 100 of FIG. 1), which may be applied to an electronic device, such as a television (TV), a desktop personal computer and so on, or a portable device, e.g. a PDA, a smart phone, a mobile phone, an MID, a laptop computer, a tablet computer, or any other type of handheld device. However, it is to be understood that the invention is not limited thereto. It is to be noted that, in this embodiment, the optical touch system comprises a touch plane without any side bars installed thereon.

First, in step S502, the depth image sensor 110 detects a touch event of an object such as a finger and then generates image information corresponding to the object to the processing circuit 130, wherein the image information includes angle information of the touch point of the object position relative to the depth image sensor 110 and depth information of the touch point of the object position relative to the depth image sensor 110. As aforementioned, the angle information is provided with an angle value and the depth information is provided with a depth value.

After receiving the angle information and the depth information corresponding to the object, in step S504, the processing circuit 130 determines whether the position of the object is located at the inside of the touch plane 120 or the outside of the touch plane 120 according to the angle information and the depth information.

In one embodiment, the step of the processing circuit 130 determining whether the position of the object is located at the inside of the touch plane 120 or the outside of the touch plane 120 based on angle information and depth information can be performed according to a predetermined angle range, a maximum depth information and aforementioned angle information and depth information relative to the touch plane 120, which were recorded in the storage unit 140 in advance, to determine whether the position of the object is located at the inside of the touch plane 120. It should be noted that the predetermined angle range can be obtained by putting the object at various sides in advance, and then recording responsive angle range of the depth image sensor 110 at sides to the storage unit 140 so as to acquire predetermined angle range. As shown in FIG. 2, angles between angle lower limit value IndexA and upper limit value Index are predetermined angle range, wherein the touch point positions outside of the predetermined angle range can be determined as located at the outside of the touch plane, and in the predetermined angle range can be determined as located at the inside of the touch plane. For example, assume that IndexA is 10 degree and IndexB is 100 degree, then if the angle value represented by the angle information relative to the object is less than 10 degree and greater than 100 degree, it can be determined that the position of the object is located at the outside of the predetermined angle range, i.e. the outside of the touch plane. Contrarily, if the angle value represented by the angle information relative to the object is between 10 and 100 degree, the position of the object could be fallen inside the touch plane, or could be fallen outside the touch plane, and thus further confirmation required by use of the depth information.

Figure 6:
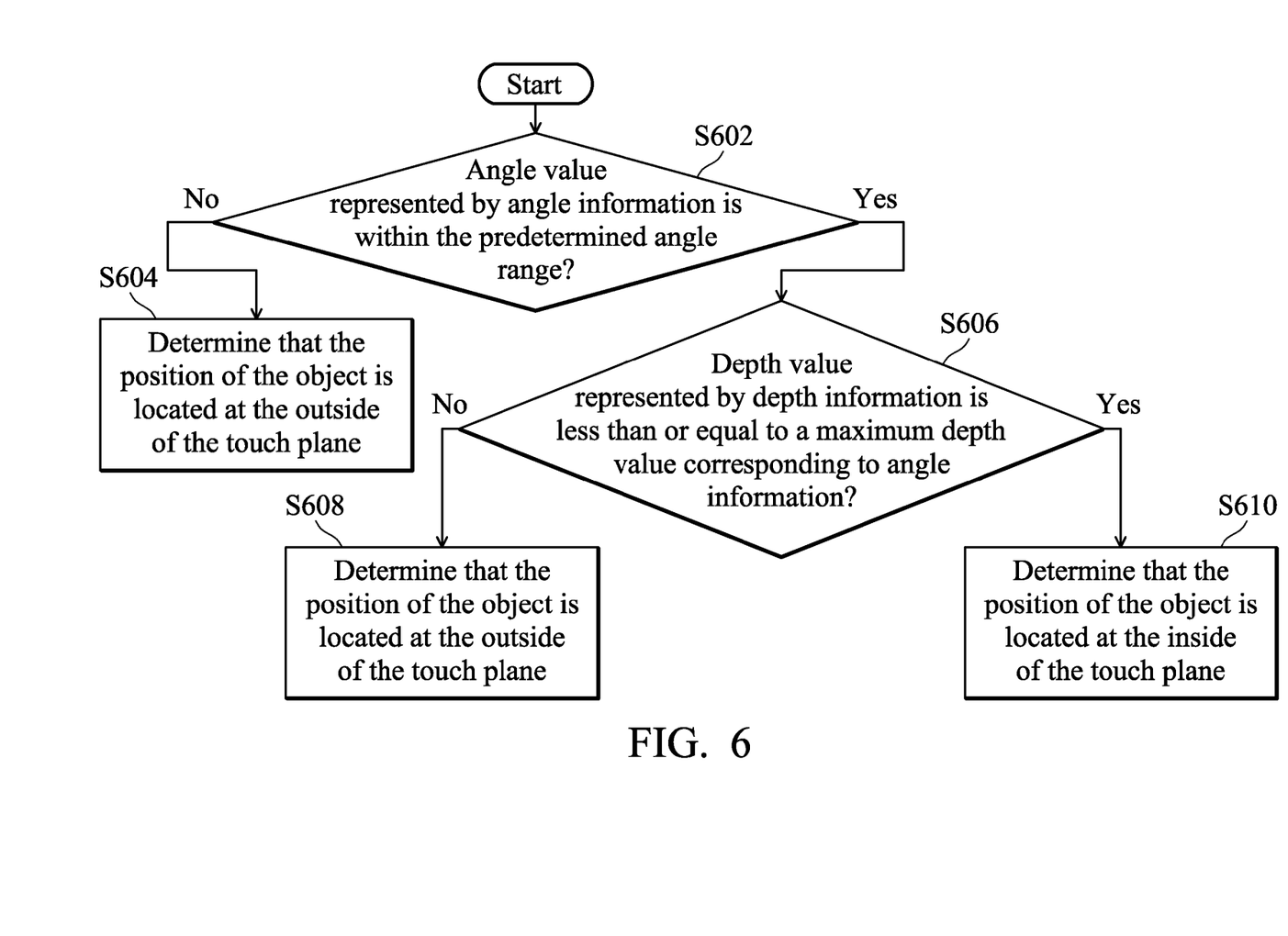
FIG. 6 is a flowchart of another embodiment of a method for determining positions of objects of the invention.

FIG. 6 is a flowchart of another embodiment of a method for determining positions of objects of the invention for determining whether the position of the object is located at the inside of the touch plane 120 or the outside of the touch plane 120 according to the angle information and the depth information captured by the depth image sensor 110.

First, in step S602, the processing circuit 130 determines whether the angle value represented by the angle information is within the predetermined angle range. For example, if the predetermined angle range is defined as angles between 10 degree and 100 degree, the processing circuit 130 can determine whether the angle value represented by the angle information is within the predetermined angle range by determining whether the angle value of the angle information represents an angle between 10 degree and 100 degree.

When the angle value represented by the angle information is not an angle within the predetermined angle range (e.g., the angle value represented by the angle information is the angle less than 10 degree or greater than 100 degree) (No in step S602), which means that the position of the object is not within the touch plane 120, the processing circuit 130 thus directly determines, in step S604, that the position of the object is located at the outside of the touch plane 120. Therefore, the processing circuit 130 can delete information regarding the touch point corresponding to the object and no further calculation required.

When the angle value represented by the angle information is an angle within the predetermined angle range (e.g., the angle value represented by the angle information is the angle greater than 10 degree and less than 100 degree) (Yes in step S602), which means that the position of the object may be located within the touch plane 120, in step S606, the processing circuit 130 then determines whether the depth value represented by the depth information relative to the object is less than or equal to a maximum depth value corresponding to the angle information. Note that the maximum depth value corresponding to the angle information can be obtained from the aforementioned maximum depth data curve stored in the storage unit 140.

When the depth value represented by the depth information is greater than the maximum depth value corresponding to the angle information (No in step S606), which means that the position of the object is not within the touch plane 120, the processing circuit 130 thus determines, in step S608, that the position of the object is located at the outside of the touch plane 120. Similarly, the processing circuit 130 can further delete information regarding the touch point corresponding to the object after determining that the position of the object is located at the outside of the touch plane 120.

When the depth value represented by the depth information is less than or equal to the maximum depth value corresponding to the angle value of the angle information, which represents that the position of the object is located inside the touch plane 120, thus, in step S610, the processing circuit 130 determines that the position of the object is located at the inside of the touch plane 120. Thereafter, the processing circuit 130 outputs or stores related information regarding the touch point of the object position to a device for further process. For example, as shown in FIG. 2, the processing circuit 130 can use the angle information and the depth information acquired by the depth image sensor 110 located at a corner side of the touch plane, and the angle information and the depth information acquired by the depth image sensor 110' located at another corner side of the touch plane, through algorithms of mathematical functions such as trigonometric function or triangulation locating method etc. to calculate plane coordinates of the object on the touch plane, so as to further perform a relative operation.

In other words, the processing circuit 130 may determine that the position of the object is located at the inside of the touch plane only if the angle information relative to the object represents an angle within the predetermined angle range and the depth information thereof represents a depth value less than or equal to the maximum depth value. Therefore, with above-mentioned simple process, whether the position of the object is located at the inside of the touch plane can be determined, and touch point of the object position requiring further calculations can be filtered out, thereby reducing unnecessary calculation and accelerating calculation speed.

For explanation, some specific embodiments are illustrated as examples to explain the method for determining positions of objects and details for determining whether an object (e.g. the finger(s), stylus and so on) is located at the inside of the touch plane, and those skilled in the art will understand that the present invention is not limited thereto.

Figure 7A:
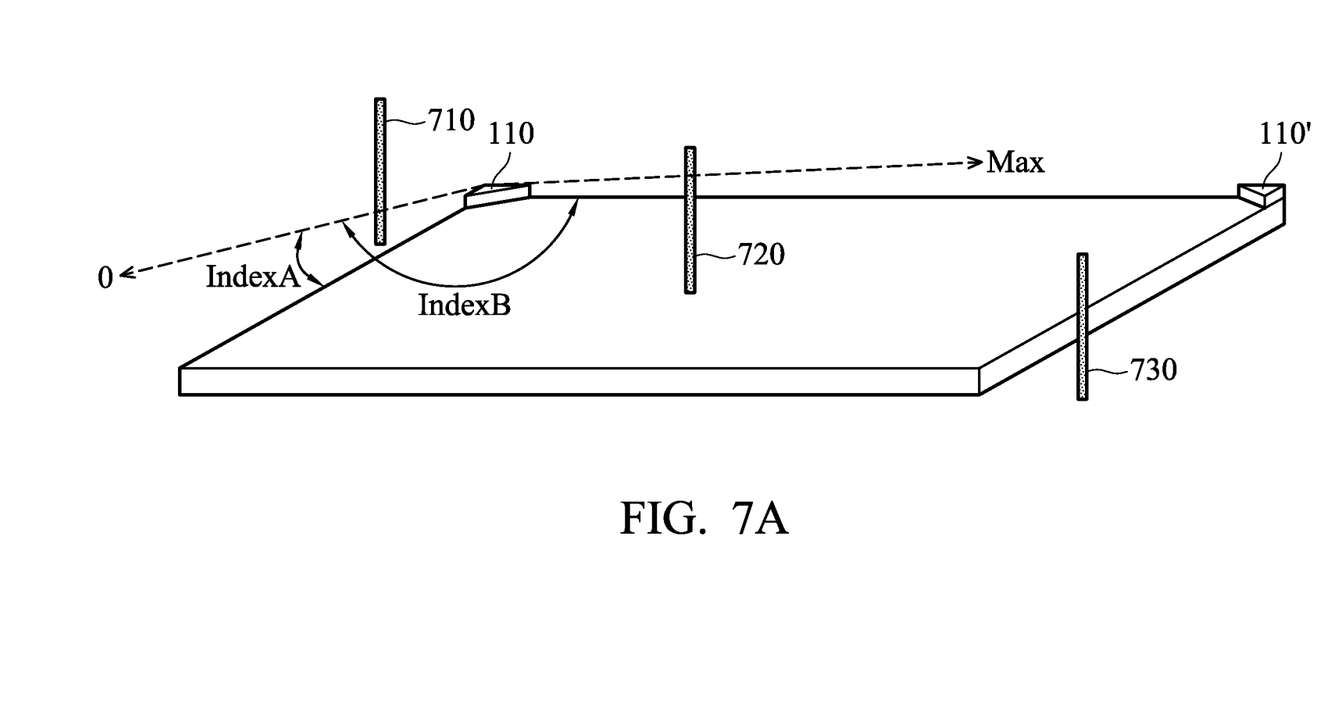
FIG. 7A is a schematic diagram illustrating an embodiment of touch points corresponding to the objects placed on different positions of the invention.
Figure 7B:
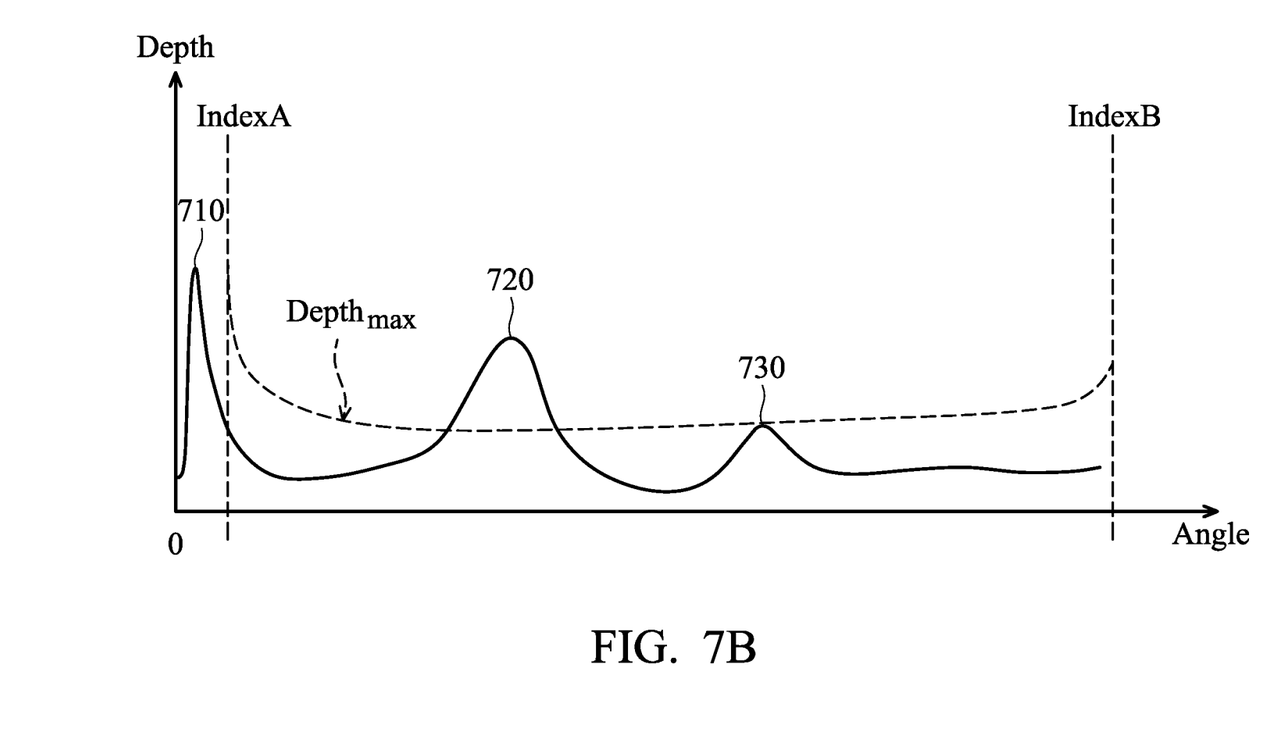
FIG. 7B is a schematic diagram illustrating an embodiment of an image signal captured by the depth image sensor illustrated at the left side in FIG. 7A of the invention.

FIG. 7A is a schematic diagram illustrating an embodiment of touch points corresponding to the objects placed on different positions of the invention. As shown in FIG. 7A, relative touch positions are represented for three fingers 710, 720 and 730 put at three different positions respectively. In this embodiment, assume that the image information is obtained from the depth image sensor 110 located at left side, and the predetermined angle range is the angle between a lower limit value IndexA and an upper limit value IndexB. FIG. 7B is a schematic diagram illustrating an embodiment of an image signal acquired from the depth image sensor 110 illustrated at the left side in FIG. 7A of the invention, where horizontal axis "Angle" represents angle of touch point of object position relative to the depth image sensor A, its direction is counted from left of 0 degree, and vertical axis "Depth" represents image strength of touch point of object position on the depth image sensor 110, where the higher the strength represents the closer the distance (the shallower the depth), on the contrary, the lower the strength, represents the farther the distance. Referring to FIG. 7B, in this embodiment, angles between 0 and the lower limit value IndexA of angle range, and angles greater than the upper limit IndexB of angle range are located at the outside of the touch plane, wherein the finger 710 that is placed closest to the depth image sensor 110 has the highest strength and least depth value, the finger 720 that is placed next closer to the depth image sensor 110 has the next highest strength and next least depth value and the farthest finger 730 has lowest strength and greatest depth value. In other words, only angles between IndexA and IndexB can be determined as located at the inside of the touch plane. As shown in FIG. 7B, because angle value of image of the finger 710 is not fallen inside the predetermined angle range, the processing circuit 130 can determine that the position of the finger 710 is located at the outside of the touch plane, and thus touch point information relative to the finger 710 is deleted.

The maximum depth data curve $Depth_{max}$ represents minimum strength (maximum depth information) of each angle of the predetermined angle range inside the touch plane, i.e. farthest distance in the touch plane for each angle. Therefore, as shown in FIG. 7B, as the strength of the finger 720 at the angle is greater than the minimum strength of that angle, which represents that a distance between the finger 720 and the depth image sensor 110 is closer than the farthest distance, the processing circuit 130 can determine that the position of the finger 720 is located at the inside of the touch plane. Contrarily, although the finger 730 is located inside of predetermined angle range, but, its strength is less than the minimum strength of this angle, which represents that the distance between the finger 730 and the depth image sensor 110 is farther than the farthest distance, so the processing circuit 130 can determine that the position of the finger 730 is located at the outside of the touch plane.

Therefore, the optical touch systems and methods for determining positions of objects of the present invention can utilize depth information provided by the depth image sensor and matched with simple side limits, thereby without side bar technique can be achieved, so, its touch plane has no need to be installed with additional side bars, thus reducing cost and making product assembling more easier. Moreover, side bars are not needed for the touch plane, and thus free of side bar shed or distorted problems.

Methods for determining positions of objects, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalent.

What is claimed is:

1. A method for determining positions of objects for use in an optical touch system, wherein the optical touch system comprises at least a depth image sensor and a touch plane, the depth image sensor having a sensing area covering the touch plane, the method comprising:
   in response to detecting an object by the depth image sensor, using the depth image sensor to obtain image information of the object, wherein the image information comprise angle information and depth information of the object relative to the depth image sensor; and
   determining whether a position of the object is located at the inside of the touch plane according to the angle information and the depth information.

2. The method of claim 1, wherein the angle information comprises an angle value and the depth information comprises a depth value, and the step of determining whether the position of the object is located at the inside of the touch plane according to the angle information and the depth information further comprises:
   determining whether the angle value of the angle information is within a predetermined angle range;
   determining that the position of the object is located at the outside of the touch plane when determining that the angle value of the angle information is not within the predetermined angle range; and
   determining whether the depth value of the depth information is less than or equal to a predetermined depth value when determining that the angle value of the angle information is within the predetermined angle range.

3. The method of claim 2, further comprising:
   determining that the position of the object is located at the inside of the touch plane when the depth value of the depth information is less than or equal to the predetermined depth value; and determining that the position of the object is located at the outside of the touch plane when the depth value of the depth information has exceeded the predetermined depth value.

4. The method of claim 3, further comprising storing or outputting information regarding a touch point corresponding to the object when determining that the position of the object is located at the inside of the touch plane.

5. The method of claim 3, further comprising deleting information regarding a touch point corresponding to the object when determining that the position of the object is located at the outside of the touch plane.

6. The method of claim 2, wherein the predetermined depth value is defined as a maximum depth value of the touch plane measured at which the angle of the object relative to the depth image sensor is equal to the angle value of the angle information.

7. The method of claim 2, wherein the depth image sensor is configured on two neighboring sides of the touch plane, and the predetermined angle range is defined as an angle range of an included angle formed between the two neighboring sides of the touch plane, where the angle range is less than a viewing angle range of the depth image sensor.

8. An optical touch system, comprising:
a depth image sensor, providing image information corresponding to the object, wherein the image information comprise angle information and depth information of the object relative to the depth image sensor;
a touch plane, wherein the depth image sensor has a sensing area covering the touch plane; and
a processing circuit, in response to detecting an object by the depth image sensor, using the depth image sensor to obtain the image information of the object and determining whether a position of the object is located at the inside or the outside of the touch plane according to the angle information and the depth information within the image information.

9. The optical touch system of claim 8, wherein the angle information comprises an angle value and the depth information comprises a depth value, and the processing circuit further determines whether the position of the object is located at the inside of the touch plane according to the angle information and the depth information by determining whether the angle value of the angle information is within a predetermined angle range, wherein the processing circuit determines that the position of the object is located at the outside of the touch plane when determining that the angle value of the angle information is not within the predetermined angle range, and the processing circuit further determines whether the depth value of the depth information is less than or equal to a predetermined depth value when determining that the angle value of the angle information is within the predetermined angle range.

10. The optical touch system of claim 9, wherein the processing circuit further determines that the position of the object is located at the inside of the touch plane when the depth value of the depth information is less than or equal to the predetermined depth value, and determines that the position of the object is located at the outside of the touch plane when the depth value of the depth information is greater than the predetermined depth value.

11. The optical touch system of claim 10, wherein the processing circuit further stores or outputs information regarding a touch point corresponding to the object when determining that the position of the object is located at the inside of the touch plane.

12. The optical touch system of claim 10, wherein the processing circuit further deletes information regarding a touch point corresponding to the object when determining that the position of the object is located at the outside of the touch plane.

13. The optical touch system of claim 8, wherein the object is a finger or a pen/stylus.

* * * * *